US011979268B2

(12) United States Patent
Jung et al.

(10) Patent No.: US 11,979,268 B2
(45) Date of Patent: *May 7, 2024

(54) METHOD AND APPARATUS FOR SELECTING AN ANTENNA PORT USING RECEIVED ANTENNA PORT SPECIFIC ADJUSTMENTS

(71) Applicant: Lenovo (Singapore) Pte. Ltd., New Tech Park (SG)

(72) Inventors: Hyejung Jung, Palatine, IL (US);
Joachim Löhr, Wiesbaden (DE);
Prateek Basu Mallick, Langen (DE);
Vijay Nangia, Woodridge, IL (US);
Ravi Kuchibhotla, Clarendon Hills, IL (US); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 63 days.

This patent is subject to a terminal disclaimer.

(21) Appl. No.: 17/666,373

(22) Filed: Feb. 7, 2022

(65) Prior Publication Data

US 2022/0158886 A1 May 19, 2022

Related U.S. Application Data

(63) Continuation of application No. 16/059,260, filed on Aug. 9, 2018, now Pat. No. 11,245,565.
(Continued)

(51) Int. Cl.
*H04B 1/401* (2015.01)
*H04B 7/06* (2006.01)
(Continued)

(52) U.S. Cl.
CPC ......... *H04L 27/2692* (2013.01); *H04B 1/401* (2013.01); *H04B 7/0626* (2013.01);
(Continued)

(58) Field of Classification Search
CPC .... H04B 1/401; H04B 7/0408; H04B 7/0602; H04B 7/0626; H04B 7/0695;
(Continued)

(56) References Cited

U.S. PATENT DOCUMENTS

| 2013/0077513 A1* | 3/2013 | Ng ..................... H04L 1/0026 370/254 |
| 2017/0026962 A1* | 1/2017 | Liu .................... H04W 74/0833 |
| 2020/0045746 A1* | 2/2020 | Zhang ................ H04W 74/006 |

* cited by examiner

*Primary Examiner* — Melvin C Marcelo
*Assistant Examiner* — Natali Pascual Peguero
(74) *Attorney, Agent, or Firm* — Loppnow & Chapa

(57) ABSTRACT

A method and apparatus is provided, where a respective reference signal associated with each of one or more downlink transmit antenna ports in a wireless communication network is received. A value is determined for each of one or more measurable characteristics relative to each of the received reference signals. One or more parameters are received, the parameters including one or more adjustments, where each adjustment is specific to one of the downlink transmit antenna ports and include adjustments in the form of one or more respective offset values to be applied to at least some of the one or more determined values of the measurable characteristics of the received reference signals. At least one downlink transmit antenna port is then to function as a serving downlink transmit antenna port for the user equipment, based upon a comparison of the resulting values of the measurable characteristics of the received reference signals after the received one or more adjustments have been applied to the corresponding determined values.

20 Claims, 7 Drawing Sheets

Related U.S. Application Data

(60) Provisional application No. 62/543,354, filed on Aug. 9, 2017.

(51) Int. Cl.
| | |
|---|---|
| *H04L 27/26* | (2006.01) |
| *H04W 52/14* | (2009.01) |
| *H04W 52/16* | (2009.01) |
| *H04W 52/24* | (2009.01) |
| *H04W 52/48* | (2009.01) |
| *H04W 52/50* | (2009.01) |
| *H04W 72/04* | (2023.01) |
| *H04W 72/044* | (2023.01) |
| *H04W 74/00* | (2009.01) |
| *H04W 74/08* | (2009.01) |
| *H04W 74/0833* | (2024.01) |

(52) U.S. Cl.
CPC ........ *H04B 7/0695* (2013.01); *H04W 52/143* (2013.01); *H04W 52/16* (2013.01); *H04W 52/24* (2013.01); *H04W 52/48* (2013.01); *H04W 52/50* (2013.01); *H04W 72/0473* (2013.01); *H04W 74/008* (2013.01); *H04W 74/0833* (2013.01)

(58) Field of Classification Search
CPC ................. H04L 27/2692; H04W 52/143; H04W 52/16; H04W 52/24; H04W 52/48; H04W 52/50; H04W 72/0473; H04W 74/008; H04W 74/0833
See application file for complete search history.

METHOD AND APPARATUS FOR SELECTING AN ANTENNA PORT USING RECEIVED ANTENNA PORT SPECIFIC ADJUSTMENTS

FIELD OF THE INVENTION

The present disclosure is directed to a method and apparatus for beam selection and random access in multi-beam operation, and more particularly, to the receipt of antenna port specific values from the network, which are used to make antenna port specific adjustments, which can impact operation and/or decision making of the user equipment relative to the different antenna ports.

BACKGROUND OF THE INVENTION

Presently, user equipment (UE), such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment.

Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

At any given time, the conditions related to establishing and maintaining a communication connection between the wireless communication device and the network via a particular cell can be different depending upon which one of the cells and/or antenna ports are being used to support the connection. These conditions can change over time, where the ability to communicate may be dependent upon the movement of the wireless communication device relative to the coverage area associated with each of the cells/antenna ports, as well as the impact that other devices, which are transmitting signals wirelessly in the vicinity of the wireless communication device either as part of or separate from the network at the same or similar frequencies, might have on any further attempted communications. In some cases, the conditions that might be of concern may be generic to the overall environment, separate from but detectable by the network. In other cases, the conditions that might be of concern may be network specific. In either case, the network may be aware of circumstances, that might be helpful to be considered, in determining the best way for a wireless communication device to establish or maintain a communication connection with the network.

The present inventors have recognized that it may be helpful for the network to convey downlink transmit antenna port specific parameters, that could be used to provide an offset or adjustment value that could be used by the wireless communication device to influence and/or better direct the operation of the wireless communication device within the network.

SUMMARY

Presently, user equipment, such as wireless communication devices, communicate with other communication devices using wireless signals. According to a possible embodiment, a method in a user equipment is provided. The method includes receiving a respective reference signal associated with each of one or more downlink transmit antenna ports in a wireless communication network. A value is determined for each of one or more measurable characteristics relative to or associated with each of the received reference signals. One or more parameters are received, the parameters including one or more adjustments, where each adjustment is specific to one of the downlink transmit antenna ports and include adjustments in the form of one or more respective offset values to be applied to at least some of the one or more determined values of the measurable characteristics of the received reference signals. The method further includes selecting at least one downlink transmit antenna port to function as a serving downlink transmit antenna port for the user equipment, based upon a comparison of the resulting values of the measurable characteristics of the received reference signals after the received one or more adjustments have been applied to the corresponding determined values.

According to another possible embodiment, a user equipment is provided. The user equipment includes a transceiver that receives a respective reference signal associated with each of one or more downlink transmit antenna ports in a wireless communication network. The user equipment further includes a controller that determines a value for each of one or more measurable characteristics relative to or associated with each of the received reference signals. The transceiver further receives one or more parameters including one or more adjustments, each adjustment being specific to one of the downlink transmit antenna ports and including adjustments in the form of one or more respective offset values to be applied to at least some of the one or more determined values of the measurable characteristics of the received reference signals. The controller further selects at least one downlink transmit antenna port to function as a serving downlink transmit antenna port for the user equipment, based upon a comparison of the resulting values of the measurable characteristics of the received reference signals after the received one or more adjustments have been applied to the corresponding determined values.

According to another possible embodiment, a method in a network entity is provided. The method includes transmitting a respective reference signal via each of one or more downlink transmit antenna ports, which can be received by one or more user equipment from which a value can be determined for each of one or more measurable characteristics relative to or associated with each of the received reference signals. The method in the network entity further includes determining one or more parameters, which can then be transmitted to the one or more user equipment, the parameters including one or more adjustments, where each adjustment is specific to one of the downlink transmit antenna ports and include adjustments in the form of one or more respective offset values to be applied by the user equipment to at least some of the one or more determined values of the measurable characteristics of the received reference signals from which at least one downlink transmit antenna port is selected by the user equipment to function as a serving downlink transmit antenna port for the user equipment, based upon a comparison of the resulting values of the measurable characteristics of the received reference signals after the received one or more adjustments have been applied to the corresponding determined values.

According to another possible embodiment, a network entity is provided. The network entity includes a transceiver that transmits a respective reference signal via each of one or more downlink transmit antenna ports, which can be received by one or more user equipment from which a value can be determined for each of one or more measurable characteristics relative to or associated with each of the received reference signals. The network entity further includes a controller that determines one or more parameters including one or more adjustments, each adjustment being specific to one of the downlink transmit antenna ports and including adjustments in the form of one or more respective offset values to be applied by the user equipment to at least some of the one or more determined values of the measurable characteristics of the received reference signals from which at least one downlink transmit antenna port is selected by the user equipment to function as a serving downlink transmit antenna port for the user equipment, based upon a comparison of the resulting values of the measurable characteristics of the received reference signals after the received one or more adjustments have been applied to the corresponding determined values. The transceiver further transmits the determined one or more parameters to the one or more user equipment.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
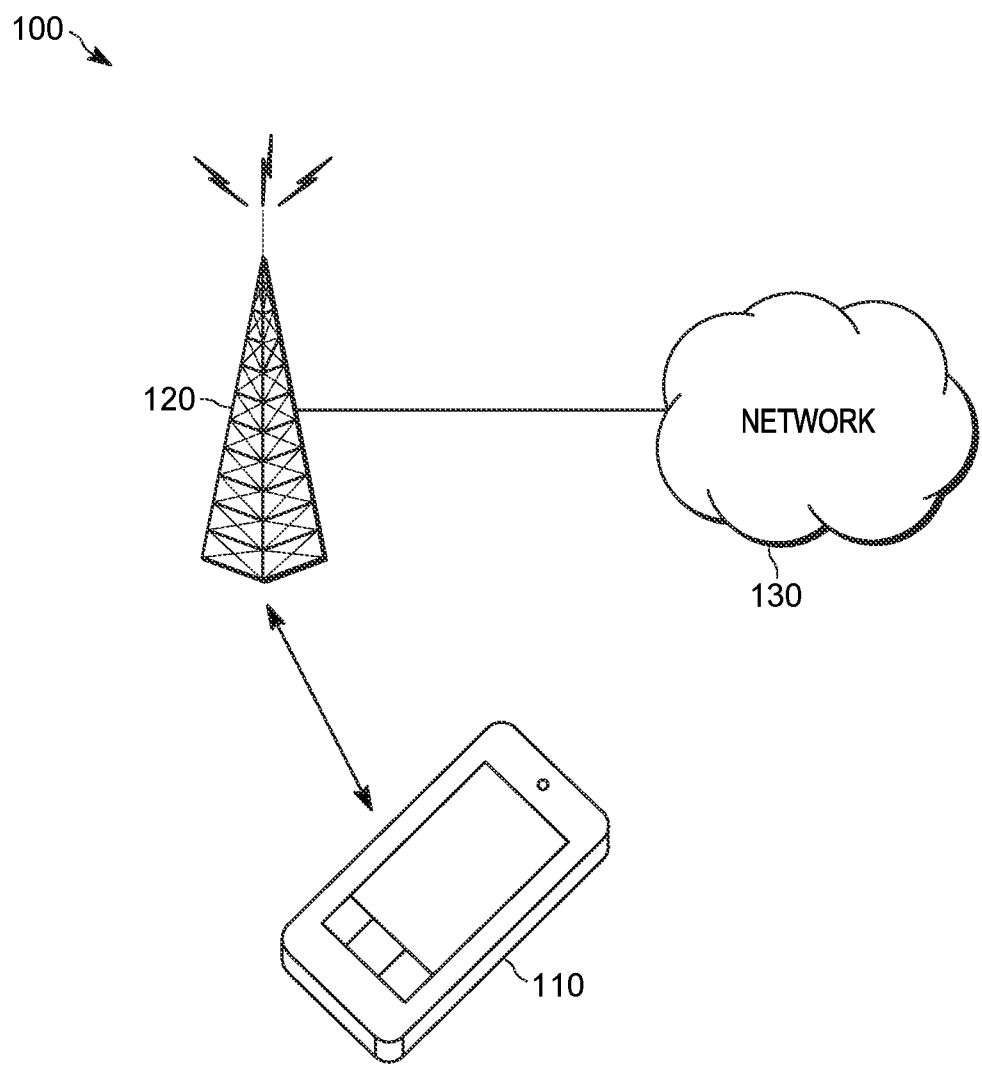
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for beam selection and random access in multi-beam operation.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In the 5th generation (5G) new radio access technology (RAT) supporting both single beam and multi-beam operations, a user equipment can evaluate one or more downlink (DL) transmit (Tx) beam qualities by performing measurement on synchronization signal (SS) block(s) and/or channel state information-reference signal (CSI-RS), wherein an antenna port of a given SS block or a given CSI-RS port is associated with one DL Tx beam. When the user equipment is in idle mode or performs an initial access procedure, the user equipment may derive a cell quality value based on one or more SS block measurements and (re)-select a cell to camp on. Further, the user equipment may select a serving SS block(s) (i.e. serving beam) from one or more received SS blocks of the selected cell. For example, an SS block with the largest SS block-reference signal received power (SS block-RSRP) value may be selected as the serving SS block. When the user equipment is in connected mode, the user equipment may further measure on CSI-RS in addition to SS block(s) and may report one or more selected CSI-RS resources/ports and/or SS blocks(s). If a network entity (NE) configures association between DL signal/channel, such as SS block and CSI-RS, and a subset of random access channel (RACH) resources (i.e. time and frequency resources) and/or a subset of RACH preamble indices, the user equipment can implicitly indicate a selected DL Tx beam (i.e. SS block or CSI-RS resource/port) by transmitting a random access channel (RACH) preamble on a RACH resource associated with the selected SS block or CSI-RS port.

When selecting a serving SS block or CSI-RS resource/port, the SS block or CSI-RS resource/port received with the highest RSRP may not always be the best choice for the user equipment in terms of random access latency and also from a system capacity perspective. For example, during handover, the user equipment may prefer to select an SS block or CSI-RS resource/port allowing fast RACH completion. Thus, the user equipment should be able to select a suitable SS block or CSI-RS resource/port flexibly depending on scenarios without creating too much interference.

The present disclosure presents methods related to network-controlled SS block or CSI-RS resource/port (re)-selection and RACH preamble power setting when changing a serving SS block or CSI-RS resource/port during RACH procedure.

In at least some prior proposals, the method to perform power ramping when the user equipment changes a user equipment Tx beam for a given serving DL Tx antenna port was discussed. More specifically, it was proposed to limit the number of user equipment Tx beam switching for RACH preamble (re)transmission with each power ramping level. Since each user equipment may have different antenna/beamforming capabilities and architectures and the user equipment may perform random access before reporting user equipment capability information, the question of how to transmit the preamble, such as whether to change a user equipment Tx beam or not, within the maximum allowed number of preamble transmissions is better to be left up to user equipment implementation. Further, the noted prior proposal did not address how to set preamble Tx power when the user equipment changes the serving DL Tx antenna port.

SS Block/CSI-RS Port Selection/m-Selection

According to a possible embodiment, for single-beam or multi-beam based network operation, a network entity can configure one or more DL Tx antenna ports on which a user equipment can make a measurement. In one embodiment, each DL Tx antenna port is associated with one DL Tx beam. In one example, a DL Tx antenna port is an antenna port of SS block. In another example, a DL Tx antenna port is an antenna port of a CSI-RS resource. In one example, some DL Tx antenna ports may correspond to antenna ports of a single CSI-RS resource, or antenna ports of different CSI-RS resources.

An antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receive (Rx) parameters such as angular spread, angle of arrival, angle of departure, spatial correlation of receiver antennas. Two antenna ports may be quasi-located with respect to a subset of the large-scale properties.

The SS block may comprise primary synchronization signal, and/or secondary synchronization signal. In one example, the SS block may comprise a PBCH (Physical broadcast channel) with associated PBCH reference signals and the SS block may also be known as a SS/PBCH block. In one example, the user equipment may assume that the same antenna port may be used for the primary synchronization signal, secondary synchronization signal, and the PBCH transmission.

In an alternate embodiment, an (DL Tx) antenna port may be associated with one or more SS blocks, each SS block with a corresponding SS block index. The antenna port associated with a first SS block (with a first SS block index) may correspond to a first DL Tx beam (beamforming pattern), and the antenna port associated with a second SS block (with a second SS block index) may correspond to a second DL Tx beam. Thus, depending on the SS block, the antenna port may correspond to different DL TX beams, i.e., the first DL Tx beam or a second DL TX beam. The first DL Tx beam may be different than the second DL TX beam. The first SS block may be different than the second SS block which may result in the first SS block index being different than the second SS block index. In one example, the first SS block may be transmitted at a first time instance and the second SS block may be transmitted at a second time instance. In another example, the first and second SS block transmission instances may overlap and in some examples may completely overlap. In one example, the user equipment may assume that any transmission instance of a SS block with the same SS block index is transmitted on the same antenna port. The user equipment may not assume the channel over which a first SS block with a first SS block index is conveyed can be inferred from the channel over a second SS block with a second SS block index (different than the first SS block index) is conveyed even if the first and second SS blocks are transmitted on the same antenna port.

In another alternate embodiment, an (DL Tx) antenna port may be associated with one or more CSI-RS resources. The antenna port associated with a first CSI-RS resource (with a first CSI-RS resource index) may correspond to a first DL Tx beam (beamforming pattern), and the antenna port associated with a second CSI-RS resource (with a second CSI-RS resource index) may correspond to a second DL Tx beam. Thus, depending on the CSI-RS resource, the antenna port may correspond to different DL Tx beams, i.e., first DL Tx beam or a second DL TX beam. The first DL Tx beam may be different than the second DL TX beam. The first CSI-RS resource may be different than the second CSI-RS resource which may result in the first CSI-RS resource index being different than the second CSI-RS resource index. In one example, the first CSI-RS resource may be transmitted at a first time instance and the second CSI-RS resource may be transmitted at a second time instance. In another example, the first and second CSI-RS resource transmission instances may overlap and in some examples may completely overlap. In one example, the UE may assume that any transmission instance of a CSI-RS resource with the same CSI-RS resource index is transmitted on the same antenna port. The UE may not assume the channel over which a first CSI-RS resource with a first CSI-RS resource index is conveyed can be inferred from the channel over a second CSI-RS resource with a second CSI-RS resource index (different than the first CSI-RS resource index) is conveyed even if the first and second CSI-RS resource are transmitted on the same antenna port.

In one embodiment, the user equipment receives parameters related to determining SS block (or CSI-RS resource/port) selection/re-selection criteria from a network entity (e.g. gNodeB) as system information (SI) or a dedicated RRC message, and selects a serving SS block(s) or CSI-RS resource(s)/port(s) according to the (re)-selection criteria determined based on the received parameters. The serving SS block or CSI-RS resource/port can be used for path loss estimation for RACH and uplink communication and for DL communication. gNB can control the user equipment's selection on the serving SS block or CSI-RS resource/port by transmitting information on configuring selection criteria, such as a user equipment Tx power setting offset or a SS block/CSI-RS port-specific RSRP offset.

In one example, parameters related to selecting a serving DL Tx antenna port may include one or more RSRP offset values and one or more RSRP threshold values. Based on the received parameters, the user equipment may select one or more DL Tx antenna ports whose RSRP measurement values are above the RSRP threshold values as candidate DL Tx antenna ports, compute ranking metrics for the candidate DL Tx antenna ports by applying RSRP offset values to RSRP measurements, rank the candidate DL Tx antenna ports based on the computed ranking metrics, and select a top ranked DL Tx antenna port as the serving DL Tx antenna port. Each RSRP offset value for a DL Tx antenna port may be dependent on a beam width (or the maximum beamforming gain) of a beam associated with the corresponding DL Tx antenna port and/or a loading condition of the corresponding DL Tx antenna port. For example, a DL Tx antenna port associated with a beam of a larger beam width or in other words a smaller beamforming gain may have a larger RSRP offset value. The loading condition of a given DL Tx antenna port can be based on for example, a number of users served by the DL Tx antenna port or a number of configured RACH resources associated with the DL Tx antenna port. In some examples, the user equipment may measure RSRP on a subset of the DL Tx antenna ports and rank candidate DL Tx antenna ports and select the serving DL Tx antenna port from within the subset of DL Tx antenna ports. In another example, a DL Tx antenna port may be selected as the serving DL Tx antenna port if the computed rank metric for the DL Tx antenna port is above a threshold.

In another example, the user equipment may receive parameters related to re-selecting a serving DL Tx antenna port, including a first RSRP offset value associated with a current serving DL Tx antenna port, a second RSRP offset value associated with a DL Tx antenna port currently not selected as a serving DL Tx antenna port but being evaluated for potential re-selection of the serving DL Tx antenna port, and an evaluation duration used to decide whether to re-select the serving DL Tx antenna port or not. In order to make the decision for re-selection, the user equipment can compute ranking metrics by applying the first RSRP offset value (e.g. a positive value) to the RSRP measurement of the current serving DL Tx antenna port and by applying the second RSRP offset value (e.g. a negative value) to the RSRP measurement of the candidate DL Tx antenna ports. If the user equipment verifies that ranking of a certain candidate DL Tx antenna port is higher than the current serving DL Tx antenna port for the indicated duration, the user equipment can perform re-selection of the serving DL Tx antenna port.

The network entity can include the SS block (re)-selection related parameters as part of essential SI, or can transmit them together with other SI. If the user equipment is in a connected mode, the user equipment may receive SS block (re)-selection related parameters for a secondary serving cell and/or for a handover target cell from the network entity of a primary serving cell as the dedicated RRC message. Further, the user equipment may receive the CSI-RS resource/port (re)-selection parameters as part of CSI-RS configuration in the dedicated RRC message. Parameters related to re-selecting a SS block or CSI-RS resource/port for RACH preamble re-transmission can be included in RACH configuration.

During a random access procedure, the user equipment may select a serving DL Tx antenna port for each preamble (re)-transmission of the RACH procedure, based on ranks of one or more DL Tx antenna ports. The user equipment may start with a DL Tx antenna port of the highest rank and then (if required) select a DL Tx antenna port of the next highest rank for preamble re-transmission. If necessary, the user equipment may update the ranking before re-transmission. Simple ranking criteria can be based on measurements with some offset values. The ranking can be further based on at least one of a measurement periodicity, an order of earliest available RACH resources in time, or availability of a dedicated RACH resource, wherein each RACH resource is associated with at least one DL Tx antenna port.

For example, the user equipment may select a DL Tx antenna port above a configured threshold that has been most recently evaluated. That is, if measurements of two DL Tx antenna ports are above the threshold, and if one was last measured 80 millisecond (ms) before and another just 5 ms before, then the latter one may be preferred. In another example, the user equipment may select the DL Tx antenna port which has the corresponding RACH opportunity earliest in time among the DL Tx antenna ports whose measurements are above the threshold. And yet in another example, UE may apply different RSRP offset values to measurements of DL Tx antenna ports, depending on whether a given DL Tx antenna port has an associated contention free random access (CFRA) resource or not. A handover command can include information required for contention based random access (CBRA) and CFRA so that the user equipment can select a serving DL Tx antenna port which may be different from a DL Tx antenna port reported in a measurement report and provided with a dedicated RACH resource. A larger RSRP offset value can be applied to provide priority for the DL Tx antenna port associated with the dedicated RACH resource over other DL Tx antenna ports without dedicated RACH resources, considering that CBRA is likely to have longer latency than CFRA due to contention. In another example, a user equipment is assigned a CFRA resource, and also receives configurations of CBRA resources, the CFRA resource and CBRA resource may be associated with the same DL Tx antenna port or different DL Tx antenna ports. If the CFRA resource is within X time units (e.g, in terms of slots, subframes, or ms) of a CBRA RACH opportunity (measurements of the corresponding DL Tx antenna port for the CFRA resource and CBRA resource are above a threshold and are thus considered to be "valid" RACH transmission opportunities), the user equipment may skip the CBRA RACH opportunity and transmit the RACH preamble on the CFRA. Thus, the user equipment does not attempt to transmit RACH on the CBRA resource. The value of X may be configured by the network entity and may depend on the average latency difference between using a CBRA and CFRA. In another example, a user equipment may be assigned a plurality of CFRA resources, each CFRA resource associated with a different DL Tx antenna port. In this case, the user equipment may transmit RACH on the first available "valid" CFRA resource (measurement of the corresponding DL Tx antenna port for the CFRA resource is above a threshold).

In another embodiment, the user equipment may receive an SS block/CSI-RS port specific or a set of SS blocks/CSI-RS ports specific backoff parameter in a random access response (RAR) message. The user equipment considers that the backoff parameter is set to 0 ms for the SS block/CSI-RS port or the set of SS blocks/CSI-RS ports without the signaled backoff parameter. In one example, the user equipment may select a random backoff time for each SS block/CSI-RS port according to a uniform distribution between 0 and the backoff parameter of a given SS block/CSI-RS port. For subsequent preamble transmission, the user equipment may select the SS block/CSI-RS port with the smallest backoff time among SS block/CSI-RS ports whose RSRP measurement values are above a RSRP threshold value. This mechanism may redistribute RACH loads across RACH resources associated different SS blocks/CSI-RS ports.

In another embodiment, if each SS block or CSI-RS resource/port has different DL Tx power, instead of SS block RSRP or CSI-RS RSRP, the user equipment can receive UL Tx power offset parameters, compare resulting adjusted UL Tx power associated with each SS block or CSI-RS resource/port, and select a SS block or CSI-RS resource/port based on the adjusted UL Tx power, for example requiring the lowest UL Tx power, or UL Tx power below a threshold.

In another embodiment, if each SS block or CSI-RS resource/port has different DL Tx power, the user equipment can receive PL (Path Loss) offset parameters, compare resulting adjusted PL (adjusted by the PL offset parameter) associated with each SS block or CSI-RS resource/port, and select a SS block or CSI-RS resource/port based on the adjusted PL, for example, the SS block or CSI-RS resource/port with the smallest adjusted PL or adjusted PL below a threshold.

In some of the above examples, the user equipment may measure RSRP/compute UL Tx power/PL corresponding to on a subset of the DL Tx antenna ports and rank candidate DL Tx antenna ports and select the SS block or CSI-RS resource/port corresponding to a serving DL Tx antenna port from within the subset of DL Tx antenna ports.

In some examples, the user equipment may have one or more receive antenna groups. An Rx antenna group may comprise one or more Rx antenna ports or Rx beams. In one example an antenna group may correspond to an antenna panel or antenna sub-array. Different receive antenna groups may have different antenna gains and may be capable of receiving signals from different spatial directions. The spatial direction or angle of arrival supported by an antenna group may overlap with that of another antenna group. Similarly, the user equipment may have one or more transmit antenna groups with a Tx antenna group comprising one or more Tx beams. Different transmit antenna groups may have different antenna gains and may be capable of transmitting or launching signals from different spatial directions. The spatial/launch direction or angle of departure/launch angle supported by an antenna group may overlap with that of another antenna group. In one example, for determining RSRP or PL (for e.g., UL Tx power computation or selection of a RACH resource for RACH transmission) from a DL Tx antenna port, the user equipment may be restricted to only perform or use measurements on a set of spatial directions using one or more Rx antenna groups, such that the UL transmissions using one or more transmit antenna groups can also be launched in those same set of spatial directions. Measurements on spatial directions that are not supported by the set of possible uplink launch angles may not be used for determining RSRP or PL related to UL transmission, such as UL Tx power computation or RACH resource selection for RACH transmission. In one example, a first antenna group is both a first Rx antenna group and a first Tx antenna group, and a second antenna group is only a second Rx antenna group. Thus, the user equipment is not capable of using the second antenna group for UL transmissions. In this case, DL measurements for determining RSRP or PL related to UL transmission, such as UL Tx power computation or RACH resource selection for RACH transmission, may be restricted to be performed on only the first Rx antenna group.

User Equipment Preamble Power Setting after Changing a Serving SS Block or CSI-RS Resource/Port During a random access procedure, the user equipment may change a serving SS block/CSI-RS port, which is used for the path loss estimate and RACH resource determination, for preamble re-transmission.

In one embodiment, a network entity can indicate a preamble Tx power adjustment value which a user equipment should apply to determine a preamble Tx power when the user equipment re-selects a SS block or CSI-RS resource/port and re-transmits a RACH preamble during a RACH procedure. In other embodiments, the user equipment may determine the preamble Tx power adjustment value, according to one or more pre-defined or configured rules. For example, gNB can measure and indicate an interference level for a subset of RACH resource associated with a DL Tx antenna port, such as SS block or CSI-RS resource/port, and the user equipment derives the power adjustment value based on the interference level difference between RACH resources of the previously selected DL Tx antenna port and the newly selected DL Tx antenna port. Alternatively, a user equipment receiver can listen to the RACH resources and measure the interference level of the RACH resources. With the determined preamble Tx power adjustment value, for example, the user equipment may determine the preamble Tx power for re-transmission as follows:

$P_{PRACH} = \min\{P_{CMAX,c,s}(i),$

PREAMBLE_RECEIVED_TARGET_POWER + $PL_{c,s}$ + $\Delta_{offset}$}_{dBm], where $P_{CMAX,c,s}(i)$ is the configured maximum user equipment transmit power defined for slot i of DL Tx antenna port s of serving cell c, $PL_{c,s}$ is the path loss estimate for DL Tx antenna port s of serving cell c, $\Delta_{offset}$ is the determined preamble Tx power adjustment value, and PREAMBLE_RECEIVED_TARGET_POWER is given by

PREAMBLE_RECEIVED_TARGET_POWER =

*preambleInitialReceivedTargetPower* + DELTA_PREAMBLE +

POWER_RAMPING_COUNTER * *powerRampingStep*, where preambleInitialReceivedTargetPower is the target preamble Rx power indicated by the NE, DELTA_PREAMBLE is the power offset dependent on a RACH preamble format or the number of preamble repetition, and POWER_RAMPING_COUNTER is the number of power ramping with initially (i.e. for initial preamble transmission) setting to zero. When the user equipment changes the serving DL Tx antenna port for re-transmission, the user equipment's power ramping level for RACH preamble re-transmission may remain unchanged to avoid additional RACH delay, especially for power-limited user equipments. The maximum allowed number of power ramping in addition to the maximum allowed number of preamble transmissions for a given random access procedure can be pre-defined and known to both the user equipment and the network entity, or can be configured and indicated by the network entity.

On the other hand, maintaining the same power ramping level as for the RACH resource associated with the previously selected DL Tx antenna port may cause unnecessary interference in the RACH resource associated with the newly selected DL Tx antenna port, if power ramping had occurred due to higher interference level in the previously used RACH resource, but the newly selected RACH resource has low interference level. In this case, it is desired to adjust the preamble transmission power level based on the interference level of the newly selected RACH resource or the interference-level difference between the two RACH resources. To determine a RACH preamble power adjustment value for a given change from a first DL Tx antenna port to a second DL Tx antenna port, the gNB may perform noise and interference estimation for a subset of RACH time/frequency resources, wherein the subset of RACH time/frequency resources are associated with one DL Tx antenna port (or a set of DL Tx antenna ports).

Alternatively, the preamble Tx power adjustment value may be dependent on user equipment's power ramping level (i.e. the number of power ramping). That is, if the change of a serving DL Tx antenna port occurs after the user equipment has already reached a higher power ramping level, a larger preamble Tx power adjustment value may be applied. The user equipment can receive a set of preamble Tx power adjustment values, each of which is applicable to a different power ramping level. The network entity can transmit the set of preamble Tx power adjustment values in RACH configuration, as part of the system information, or as part of a handover command or other dedicated RRC messages.

In some examples, the preamble Tx power adjustment value $\Delta_{offset}$ may be configured by the network entity for each of a subset of the one or more DL Tx antenna port s. For example, $\Delta_{offset}$ may be 0 dB for DL Tx Antenna port 0, 3 dB for DL Tx antenna port 1, and −2 dB for DL Tx antenna port 3. For a DL antenna port which is not configured with a $\Delta_{offset}$, for example DL Tx antenna port 2, the user equipment may be able to assume a value of 0 dB. The network entity may determine the $\Delta_{offset}$ for different DL Tx antenna ports by measuring the relative interference level on a subset of RACH resources associated with each of the different DL Tx antenna ports. A user equipment should apply $\Delta_{offset}$ associated with the (re-)selected SS block or CSI-RS resource/port when the user equipment prepares to (re-)transmit a RACH preamble on the RACH resource associated with the (re-)selected SS block or CSI-RS resource/port.

In one example, during the RACH procedure, if the user equipment switches from a CBRA to CFRA, the user equipment determines the PREAMBLE_RECEIVED_TARGET_POWER as,

PREAMBLE_RECEIVED_TARGET_POWER =

$preambleInitialReceivedTargetPower$ + DELTA_PREAMBLE without using the POWER_RAMPING_COUNTER when the user equipment switches from a CBRA to CFRA. If the RACH procedure is not completed, and the user equipment switches from a CFRA to CBRA, the user equipment increments the POWER_RAMPING_COUNTER and, determines the PREAMBLE_RECEIVED_TARGET_POWER as before as,

PREAMBLE_RECEIVED_TARGET_POWER =

$preambleInitialReceivedTargetPower$ + DELTA_PREAMBLE +

POWER_RAMPING_COUNTER * $powerRampingStep$,

In another example, the user equipment maintains a separate POWER_RAMPING_COUNTER for CFRA and CBRA and uses the corresponding counter for PREAMBLE_RECEIVED_TARGET_POWER determination as, for CFRA:

PREAMBLE_RECEIVED_TARGET_POWER =

$preambleInitialReceivedTargetPower$ + DELTA_PREAMBLE +

POWER_RAMPING_COUNTER_CFRA * $powerRampingStep$, for CBRA:

PREAMBLE_RECEIVED_TARGET_POWER =

$preambleInitialReceivedTargetPower$ + DELTA_PREAMBLE +

POWER_RAMPING_COUNTER_CBRA * $powerRampingStep$,

If the RACH procedure is not completed, and the user equipment switches from a CFRA to CBRA, the user equipment increments both the POWER_RAMPING_COUNTER_CFRA, and the POWER_RAMPING_COUNTER_CBRA. Incrementing both of the power ramping counters may compensate the inter-cell interference affecting both CFRA and CBRA. While, if the user equipment switches from CBRA to CFRA or continues to use CBRA to transmit RACH, the user equipment increments only the POWER_RAMPING_COUNTER_CBRA.

Figure 2:
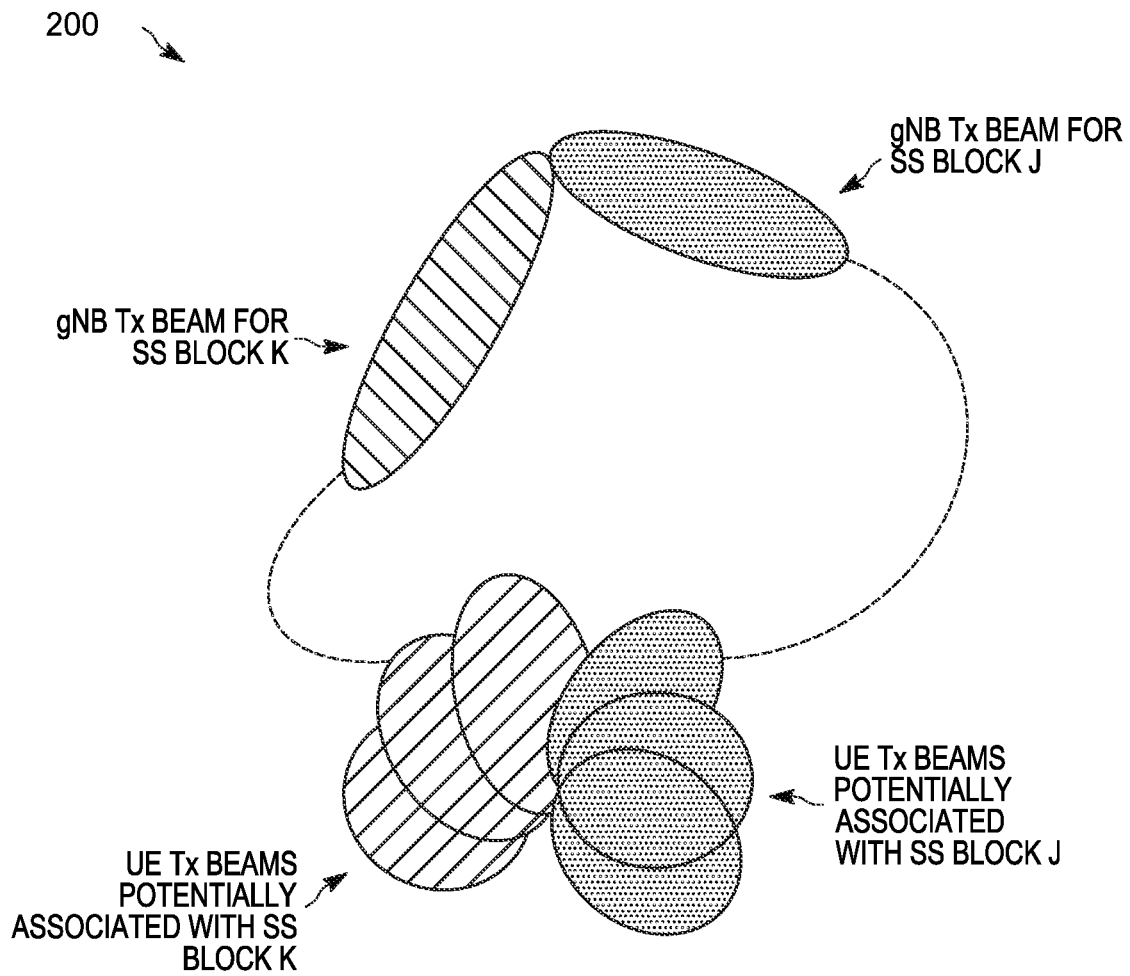
FIG. 2 is a plan view of respective transmit beams for each of an exemplary base station and a user equipment, which can each be associated with one of a pair of serving synchronization signal blocks for a random access channel.

FIG. 2 illustrates a plan view 200 of respective transmit beams for each of an exemplary base station and a user equipment, which can each be associated with one of a pair of serving synchronization signal blocks for a random access channel. In the example illustrated in FIG. 2, the user equipment's channel may provide two suitable SS blocks, SS block K and SS block J, for a serving SS block. The user equipment first chooses the SS block K as the serving SS block, and transmits three RACH preambles, wherein the first two transmissions are performed with the same user equipment Tx beam with one power ramping in the second transmission and the third transmission is done with a different user equipment Tx beam. The user equipment power ramping remains unchanged when the user equipment changes the user equipment Tx beam, and the user equipment calculates the preamble Tx power at least based on the most recent path loss estimate and power ramping. For the fourth preamble transmission, the user equipment changes the serving SS block to the SS block J, updates the path loss estimate based on measurement of SS block J, and applies a signaled preamble Tx power adjustment value corresponding to power ramping level 1 (i.e. one power ramping) to determine the preamble Tx power. When reaching the maximum power, the user equipment may transmit at the maximum power if the recalculated power for a new user equipment Tx beam or for the new serving SS block, the SS block J, is still at or above the maximum configured power. The maximum configured power can be set either per cell or per DL Tx antenna port (SS block or CSI-RS resource/port) of the cell.

Figure 3:
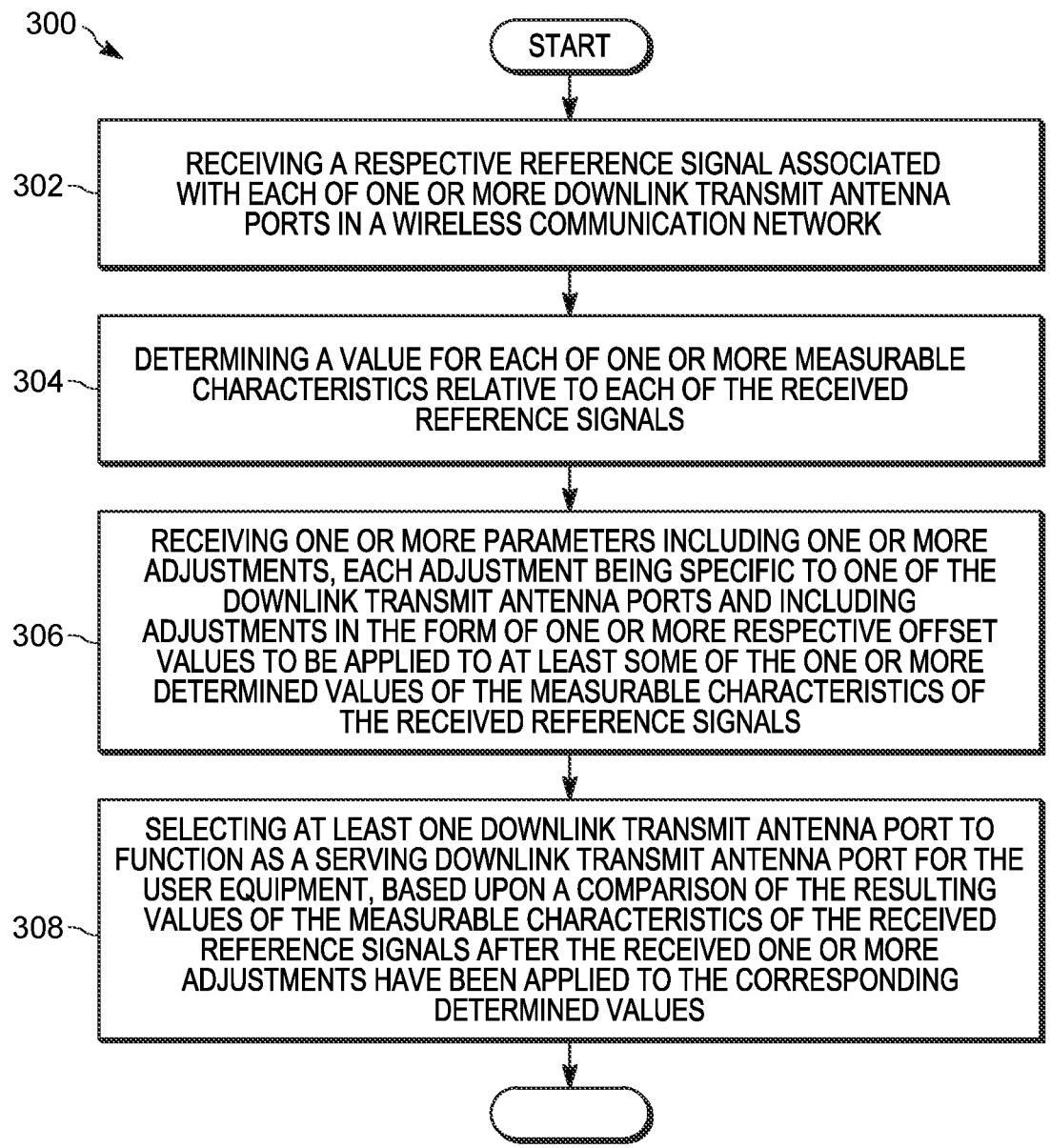
FIG. 3 is a flow diagram for providing beam selection in a user equipment, using downlink transmit antenna port specific adjustments.

FIG. 3 illustrates a flow diagram 300 for providing beam selection in a user equipment, using downlink transmit antenna port specific adjustments. More specifically, a method in a user equipment is provided. The method includes receiving 302 a respective reference signal associated with each of one or more downlink transmit antenna ports in a wireless communication network. A value is determined 304 for each of one or more measurable characteristics relative to each of the received reference signals. One or more parameters are received 306, the parameters including one or more adjustments, where each adjustment is specific to one of the downlink transmit antenna ports and include adjustments in the form of one or more respective offset values to be applied to at least some of the one or more determined values of the measurable characteristics of the received reference signals. The method further includes selecting 308 at least one downlink transmit antenna port to function as a serving downlink transmit antenna port for the user equipment, based upon a comparison of the resulting values of the measurable characteristics of the received reference signals after the received one or more adjustments have been applied to the corresponding determined values.

In some instances, the one or more downlink transmit antenna ports can be one or more of synchronization signal block antenna ports, or channel state information-reference signal antenna ports of one or more channel state information-reference signal resources.

In some instances, the method can further include providing to the wireless communication network an identification of the selected at least one serving downlink transmit antenna port by transmitting at least one random access preamble on at least one random access channel resource, wherein the at least one random access channel resource is associated with the selected at least one serving downlink transmit antenna port. In some of these instances, the method can still further include selecting the at least one random access preamble from at least one subset of random access preambles, wherein the at least one subset of random access preambles is associated with the selected at least one serving downlink transmit antenna port.

In some instances, the method can further include receiving an indication of at least one contention free random access resource associated with a first set of downlink transmit antenna ports and at least one contention based random access resource associated with a second set of downlink transmit antenna ports and selecting the at least one downlink transmit antenna port to function as a serving downlink transmit antenna port from the first and second sets of downlink transmit antenna ports.

In some instances, the method can further include transmitting the indication of the selected at least one serving downlink transmit antenna port on a physical uplink control channel.

In some instances, the method can further include receiving the one or more parameters in at least one of a dedicated radio resource control message or a broadcast system information message.

In some instances, the measureable characteristics can include at least a reference signal received power. In some of these instances, the one or more adjustments can include one or more reference signal received power offset values and one or more reference signal received power threshold values. Still further, the one or more reference signal received power offset values can include at least one of a first value associated with a current serving downlink transmit antenna port or a second value associated with a downlink transmit antenna port currently not selected as a serving downlink transmit antenna port. In the some of the same or other instances, the one or more reference signal received power offset values can be dependent on beam widths of beams associated with the one or more downlink transmit antenna ports. In some instances, selecting the at least one downlink transmit antenna port is based upon a comparison of the resulting values of the reference signal received power after the received one or more reference signal received power offset values have been applied with the one or more reference signal received power threshold values.

In some instances, the one or more adjustments are dependent on a loading condition of each of the one or more downlink transmit antenna ports, wherein the loading condition comprises at least one of a number of users being served by a corresponding downlink transmit antenna port or a number of configured random access channel resources associated with the corresponding downlink transmit antenna port.

In some instances, the one or more parameters can include a duration, wherein the duration is used to decide whether or not to re-select a serving downlink transmit antenna port.

In some instances, the method can further include ranking the one or more downlink transmit antenna ports based on the determined value of the measureable characteristics and the received one or more parameters, and selecting the at least one serving downlink transmit antenna port based on ranks of the one or more downlink transmit antenna ports for each of one or more random access preamble transmissions of a random access procedure. In some of these instances, ranking can be further based on at least one of a measurement periodicity, an order of earliest available random access channel resources in time, or availability of a dedicated random access channel resource, wherein each random access channel resource is associated with at least one downlink transmit antenna port.

Figure 4:
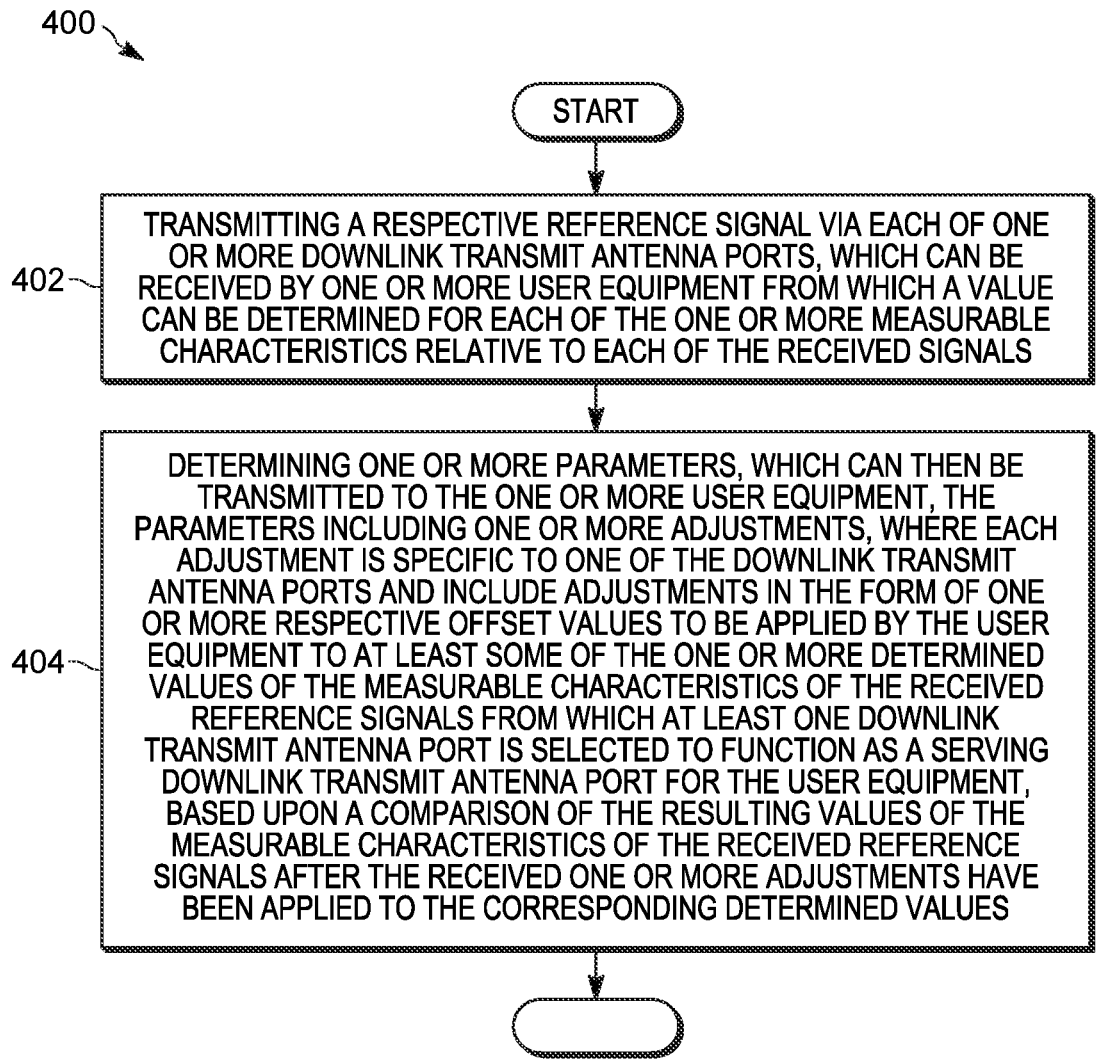
FIG. 4 is a flow diagram for providing downlink transmit antenna port specific adjustments by a network entity to one or more user equipment for use in beam selection.

FIG. 4 illustrates a flow diagram 400 for providing downlink transmit antenna port specific adjustments by a network entity to one or more user equipment for use in beam selection. More specifically, a method in a network entity is provided. The method includes transmitting 402 a respective reference signal via each of one or more downlink transmit antenna ports, which can be received by one or more user equipment from which a value can be determined for each of one or more measurable characteristics relative to each of the received reference signals. The method in the network entity further includes determining 404 one or more parameters, which can then be transmitted to the one or more user equipment, the parameters including one or more adjustments, where each adjustment is specific to one of the downlink transmit antenna ports and include adjustments in the form of one or more respective offset values to be applied by the user equipment to at least some of the one or more determined values of the measurable characteristics of the received reference signals from which at least one downlink transmit antenna port is selected to function as a serving downlink transmit antenna port for the user equipment, based upon a comparison of the resulting values of the measurable characteristics of the received reference signals after the received one or more adjustments have been applied to the corresponding determined values.

Figure 5:
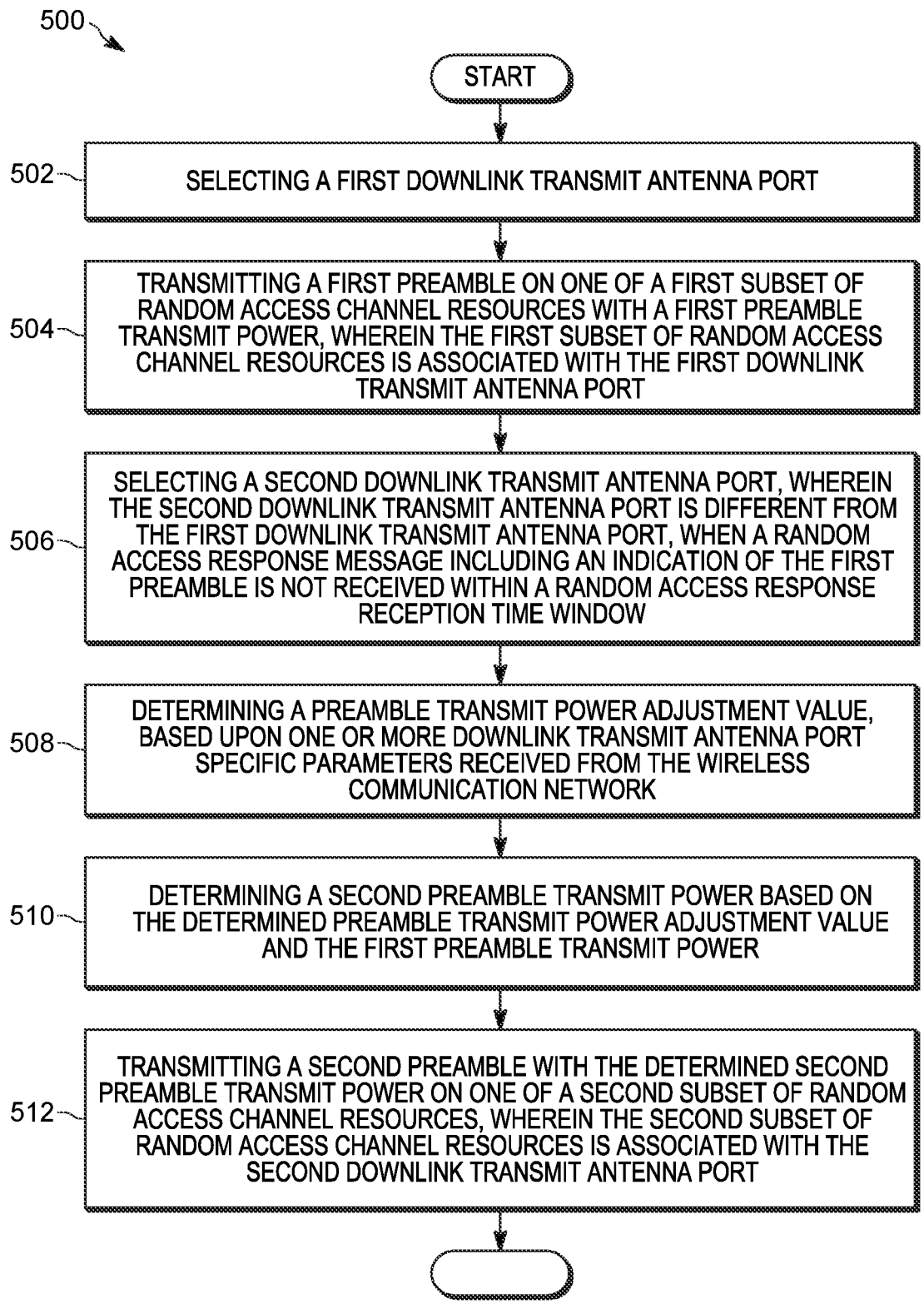
FIG. 5 is a flow diagram for determining a preamble transmit power adjustment value for use in a random access procedure by a user equipment, based on downlink transmit antenna port specific parameters received from a network entity.

FIG. 5 illustrates a flow diagram 500 for determining a preamble transmit power adjustment value for use in a random access procedure by a user equipment, based on downlink transmit antenna port specific parameters received from a network entity. More specifically, a method in a user equipment during a random access procedure is provided. The method includes selecting 502 a first downlink transmit antenna port. A first preamble is then transmitted 504 on one of a first subset of random access channel resources with a first preamble transmit power, wherein the first subset of random access channel resources is associated with the first downlink transmit antenna port. A second downlink transmit antenna port is then selected 506, wherein the second downlink transmit antenna port is different from the first downlink transmit antenna port, when a random access response message including an indication of the first preamble is not received within a random access response reception time window. A preamble transmit power adjustment value is then determined 508, based upon one or more downlink transmit antenna port specific parameters received from the wireless communication network. A second preamble transmit power based on the determined preamble transmit power adjustment value and the first preamble transmit power is determined 510. A second preamble with the determined second preamble transmit power is then transmitted 512 on one of a second subset of random access channel resources, wherein the second subset of random access channel resources is associated with the second downlink transmit antenna port.

In some instances, the preamble transmit power adjustment value can be based on parameter value differences between downlink transmit antenna port specific parameter values, which are specific to the first downlink transmit antenna port and the second downlink transmit antenna port.

In some instances, the first and second downlink transmit antenna ports can be one or more of synchronization signal block antenna ports, or channel state information-reference signal antenna ports.

In some instances, the preamble transmit power adjustment value can be derived by the user equipment from the antenna port specific parameters received from the wireless communication network.

In some instances, determining a preamble transmit power adjustment value can include receiving an indication of the preamble transmit power adjustment value, as part of the one or more downlink transmit antenna port specific parameters. In some of these instances, the preamble transmit power adjustment value can be indicated in a system information block. In some of these and/or other instances, the preamble transmit power adjustment value can be indicated in a dedicated radio resource control message. Further yet, the preamble transmit power adjustment value can be dependent on a number of power rampings that occur before transmitting the second preamble in the random access procedure. When the second preamble transmit power is determined, the transmit adjustment value can be dependent upon an earlier power ramping level based upon a set of transmit power adjustment values received, where each of the transmit power adjustment values in the set is applicable to a different ramping level.

In some instances, the preamble transmit power adjustment value can be based on a first measurement on the first subset of random access channel resources and a second measurement on the second subset of random access channel resources. In some of these instances, the respective downlink transmit antenna port specific parameters can include an indication of an interference level for a subset of random access channel resources associated with the selected first and second downlink transmit antenna ports. In detecting the interference level, a base station of the wireless communication network can perform noise and interference estimation for the subset of random access channel time and frequency resources respectively associated with a particular downlink transmit antenna port. In some of these or other instances, the method can further include receiving indications of the first and second measurements, and determining the preamble transmit power adjustment value using the first and second measurements according to one or more predefined or pre-configured rules. Further yet, the method can further include performing measurement on the first subset of random access channel resources and the second subset of random access channel resources to obtain the first and second measurements.

Figure 6:
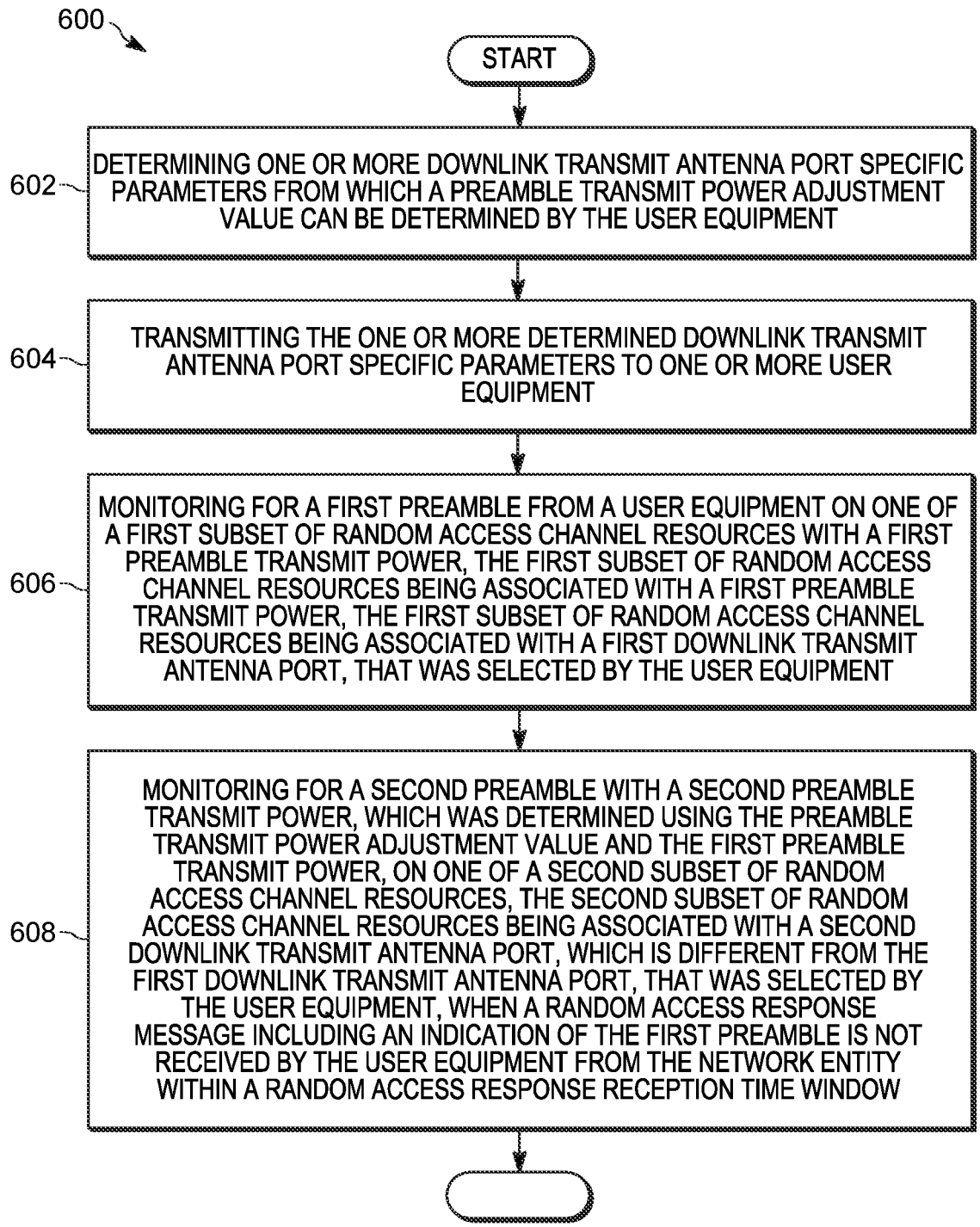
FIG. 6 is a flow diagram for providing downlink transmit antenna port specific parameters by a network entity to one or more user equipment for use in determining a preamble transmit power adjustment value.

FIG. 6 illustrates a flow diagram 600 for providing downlink transmit antenna port specific parameters by a network entity to one or more user equipment for use in determining a preamble transmit power adjustment value. More specifically, a method in a network entity during a random access procedure is provided. The method includes determining 602 one or more downlink transmit antenna port specific parameters from which a preamble transmit power adjustment value can be determined by the user equipment, and transmitting 604 the one or more determined downlink transmit antenna port specific parameters to one or more user equipment. The method further includes monitoring 606 for a first preamble from a user equipment on one of a first subset of random access channel resources, wherein the first preamble is transmitted with a first preamble transmit power by the user equipment. The first subset of random access channel resources is associated with a first downlink transmit antenna port, that was selected by the user equipment. The method still further includes monitoring 608 for a second preamble, wherein the second preamble is transmitted by the user equipment with a second preamble transmit power, which was determined using the preamble transmit power adjustment value and the first preamble transmit power, on one of a second subset of random access channel resources. The second subset of random access channel resources is associated with a second downlink transmit antenna port, which is different from the first downlink transmit antenna port, that was selected by the user equipment, when a random access response message including an indication of the first preamble is not received by the user equipment from the network entity within a random access response reception time window.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
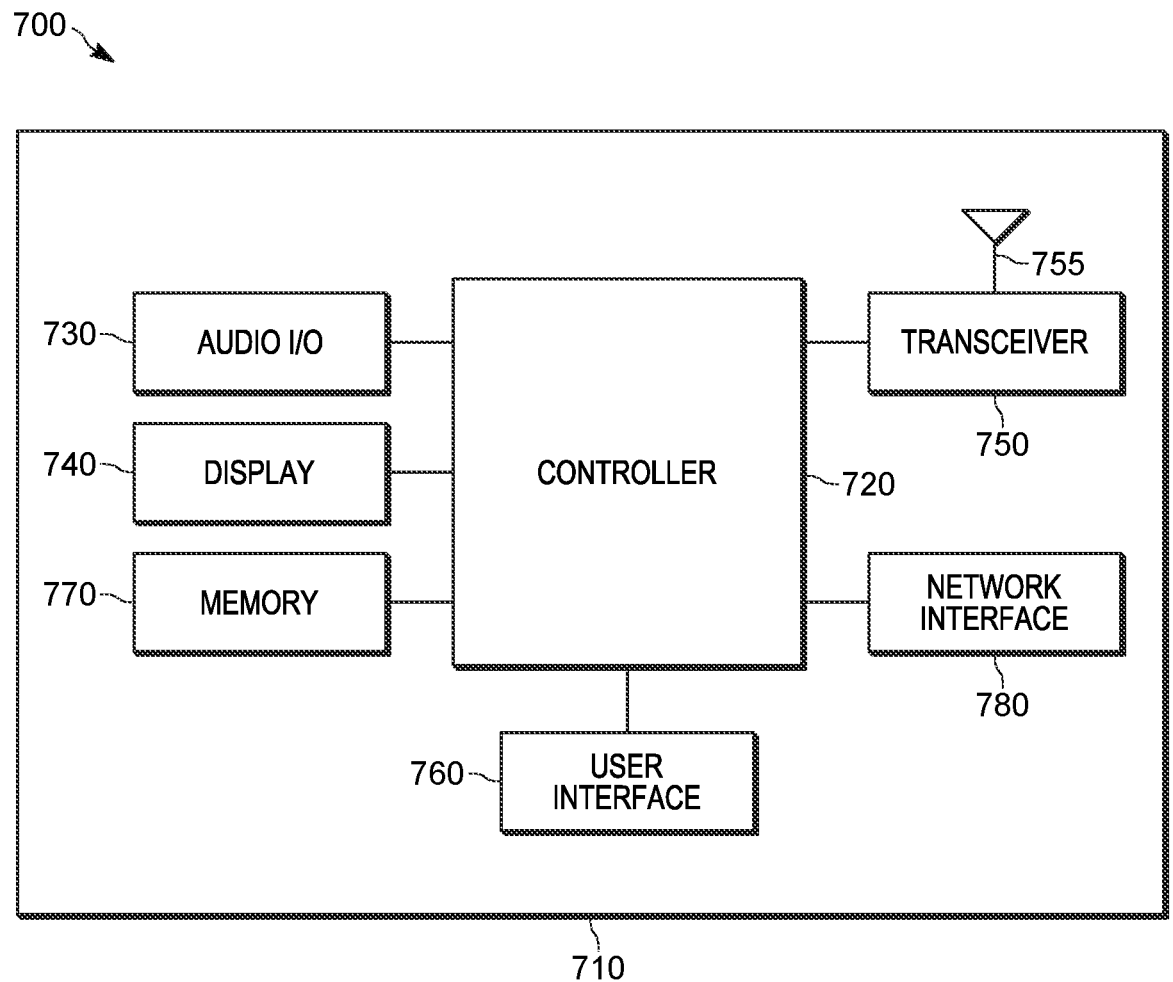
FIG. 7 is an example block diagram of an apparatus according to a possible embodiment.

FIG. 7 is an example block diagram of an apparatus 700, such as the wireless communication device 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random access memory, a read only memory, an optical memory, a solid state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment, the method comprising:
receiving one or more reference signals in a wireless communication network;
determining a value for each of one or more measurable characteristics relative to each of the received reference signals; and
selecting at least one reference signal, based upon a comparison of the resulting values of the measurable characteristics of the received reference signals and based on an availability of a dedicated contention free random access channel resource, where the dedicated contention free random access channel resource is a resource dedicated for a particular user equipment to use with a random access channel, which is associated with the selected at least one reference signal.

2. The method in accordance with claim 1, further comprising, prior to selecting at least one reference signal, receiving one or more parameters including one or more adjustments, each adjustment being specific to at least one of the reference signals and including adjustments in the form of one or more respective offset values to be applied to at least some of the one or more determined values of the measurable characteristics of the received reference signals.

3. The method of claim 2, further comprising receiving the one or more parameters in at least one of a dedicated radio resource control message or a broadcast system information message.

4. The method of claim 2, wherein the measureable characteristics comprise at least a reference signal received power, and wherein the one or more adjustments include one or more reference signal received power offset values and one or more reference signal received power threshold values.

5. The method of claim 4, wherein the one or more reference signal received power offset values include at least one of a first value associated with a current serving downlink transmit antenna port or a second value associated with a downlink transmit antenna port currently not selected as a serving downlink transmit antenna port.

6. The method of claim 4, wherein selecting the at least one reference signal is based upon a comparison of the resulting values of the reference signal received power after the received one or more reference signal received power offset values have been applied with the one or more reference signal received power threshold values.

7. The method of claim 2, wherein the one or more parameters include a duration, wherein the duration is used to decide whether or not to re-select a reference signal.

8. The method of claim 2, further comprising:
ranking the one or more reference signals based on the determined value of the measureable characteristics and the received one or more parameters; and
selecting the at least one reference signal based on ranks of the one or more reference signals for each of one or more random access preamble transmissions of a random access procedure.

9. The method in accordance with claim 1, wherein each of the reference signals is associated with one of one or more downlink transmit antenna ports.

10. The method of claim 1, further comprising providing to the wireless communication network an identification of the selected at least one reference signal by transmitting at least one random access preamble on at least one random access channel resource, wherein the at least one random access channel resource is associated with the selected at least one reference signal.

11. The method of claim 1, further comprising:
receiving an indication of at least one contention free random access resource associated with a first set of reference signals and at least one contention based random access resource associated with a second set of reference signals, and
selecting the at least one reference signal from the first and second sets of reference signals.

12. The method of claim 1, further comprising transmitting the indication of the selected at least one reference signal on a physical uplink control channel.

13. The method of claim 1, wherein the one or more adjustments are dependent on a loading condition of each of the one or more reference signals, wherein the loading condition comprises at least one of a number of users being served by a corresponding reference signal or a number of configured random access channel resources associated with the corresponding reference signal.

14. The method of claim 1, wherein selecting the at least one reference signal is further based on an order of earliest available random access channel resources in time, wherein each random access channel resource is associated with at least one reference signal.

15. A user equipment comprising:
a transceiver that receives one or more reference signals in a wireless communication network; and
a controller that determines a value for each of one or more measurable characteristics relative to each of the received reference signals;
wherein the controller further selects at least one reference signal, based upon a comparison of the resulting values of the measurable characteristics of the received reference signals and based on an availability of a dedicated contention free random access channel resource, where the dedicated contention free random access channel resource is a resource dedicated for a particular user equipment to use with a random access channel, which is associated with the selected at least one reference signal.

16. The user equipment in accordance with claim 15, wherein the transceiver, prior to the controller selecting at least one reference signal, receives one or more parameters including one or more adjustments, each adjustment being specific to at least one of the reference signals and including adjustments in the form of one or more respective offset values to be applied to at least some of the one or more determined values of the measurable characteristics of the received reference signals.

17. The user equipment of claim 16, wherein the transceiver further receives the one or more parameters in at least one of a dedicated radio resource control message or a broadcast system information message.

18. The user equipment of claim 16, wherein the measureable characteristics comprise at least a reference signal received power, and wherein the one or more adjustments include one or more reference signal received power offset values and one or more reference signal received power threshold values.

19. The user equipment of claim 16, wherein the controller further ranks the one or more reference signals based on the determined value of the measureable characteristics and the received one or more parameters, and selects the at least one reference signal based on ranks of the one or more reference signals for each of one or more random access preamble transmissions of a random access procedure.

20. The user equipment in accordance with claim 15, wherein each of the reference signals is associated with one of one or more downlink transmit antenna ports.

* * * * *